(12) United States Patent
Montemurro et al.

(10) Patent No.: US 11,696,133 B2
(45) Date of Patent: Jul. 4, 2023

(54) METHOD AND SYSTEM FOR PROVISIONING DEVICE SPECIFIC WLAN CREDENTIALS

(71) Applicant: BLACKBERRY LIMITED, Waterloo (CA)

(72) Inventors: Michael Peter Montemurro, Toronto (CA); James Randolph Winter Lepp, Kanata (CA); Stephen McCann, Southampton (GB)

(73) Assignee: BlackBerry Limited, Waterloo (CA)

( * ) Notice: Subject to any disclaimer, the term of this patent is extended or adjusted under 35 U.S.C. 154(b) by 492 days.

(21) Appl. No.: 16/281,783

(22) Filed: Feb. 21, 2019

(65) Prior Publication Data

US 2020/0275272 A1    Aug. 27, 2020

(51) Int. Cl.
*H04W 12/069*    (2021.01)
*H04L 41/0806*    (2022.01)
*H04W 84/12*    (2009.01)
*H04L 101/622*   (2022.01)
*H04L 9/40*      (2022.01)

(52) U.S. Cl.
CPC ....... *H04W 12/069* (2021.01); *H04L 41/0806* (2013.01); *H04L 63/0823* (2013.01); *H04L 63/0876* (2013.01); *H04L 2101/622* (2022.05); *H04W 84/12* (2013.01)

(58) Field of Classification Search
CPC .............. H04W 12/069; H04W 84/12; H04L 41/0806; H04L 61/6022; H04L 63/0823; H04L 63/0876
See application file for complete search history.

(56) References Cited

U.S. PATENT DOCUMENTS

| | | | |
|---|---|---|---|
| 10,169,587 B1 * | 1/2019 | Nix | G06F 21/57 |
| 2007/0280207 A1 * | 12/2007 | Shimizu | H04L 29/1233 370/353 |
| 2017/0149799 A1 * | 5/2017 | Vamaraju | H04L 63/126 |
| 2017/0257819 A1 | 9/2017 | McCann | |
| 2017/0289157 A1 * | 10/2017 | Dawoud Shenouda Dawoud | H04L 63/0853 |
| 2017/0302666 A1 * | 10/2017 | Dawoud Shenouda Dawoud | H04L 9/3265 |
| 2018/0109418 A1 * | 4/2018 | Cammarota | H04L 9/0827 |
| 2018/0248871 A1 * | 8/2018 | Tsirkin | H04W 12/06 |
| 2018/0352487 A1 * | 12/2018 | Fan | H04W 12/041 |
| 2019/0149987 A1 * | 5/2019 | Moore | G06F 3/167 726/9 |
| 2021/0036988 A1 * | 2/2021 | McKibben | H04W 12/122 |

(Continued)

OTHER PUBLICATIONS

Patent Cooperation Treaty International Searching Authority, Written Opinion of the International Searching Authority for Application No. PCT/CA2019/051519, dated Jan. 31, 2020 (6 pages).

(Continued)

*Primary Examiner* — Chris Parry
*Assistant Examiner* — Steven C Nguyen
(74) *Attorney, Agent, or Firm* — Moffat & Co

(57) ABSTRACT

A method at an electronic device, the method including initiating authentication with a network through a network element; providing a configuration request, the configuration request including an attribute set for the electronic device; and receiving a configuration response, the configuration response including a certificate or credential for future authentication with the network.

13 Claims, 5 Drawing Sheets

(56) References Cited

U.S. PATENT DOCUMENTS

2021/0266735 A1* 8/2021 Hu .................... H04L 61/5038
2021/0345099 A1* 11/2021 Raman ................ H04W 64/006

OTHER PUBLICATIONS

Patent Cooperation Treaty International Search Report for Application No. PCT/CA2019/051519, dated Jan. 31, 2020 (3 pages).
WiFi Alliance, "Device Provisioning Protocol Specification version 1.1", 2018, pp. 1-124.
Supplementary European Search Report, EP Application No. 19916416.1, dated Oct. 12, 2022.

* cited by examiner

METHOD AND SYSTEM FOR PROVISIONING DEVICE SPECIFIC WLAN CREDENTIALS

FIELD OF THE DISCLOSURE

The present disclosure relates to electronic devices, and in particular relates to a connection to Wi-Fi networks from electronic devices.

BACKGROUND

When scanning for an active Wi-Fi connection point, an electronic device may either use passive scanning or active scanning. Passive scanning involves the device listening for beacon signals from the Wi-Fi connection points. However, this technique is typically slow and requires the electronic device's receiver be on for an extended period, which may waste battery life on a portable electronic device. Active scanning involves the electronic device sending out a request to find connection points. Such requests typically include the Media Access Control (MAC) address of the electronic device. Since active scanning is better for battery life, portable electronic devices tend to use this technique. Further, other Wi-Fi signaling may also include the MAC address.

A MAC address is an identifier which is considered to be globally unique. Such address is part of the data link layer and is used as a network address for most Institute for Electrical and Electronics Engineers (IEEE) 802 protocols. Because the MAC address is essentially unique, remains the same value over a long period of time, and is present in the header of every frame, it can be used for tracking a particular user. Specifically, passive receivers can look for active scanning signals or other Wi-Fi messaging, and note the MAC addresses within these signals. If a plurality of such passive receivers is located around a facility such as an airport or shopping mall, this would provide information on where a user has been, how long the user was there, among similar information. Further, if the MAC address is somehow paired or correlated with a user identity, this could further invade the user's privacy.

In order to overcome such privacy issues, electronic devices are now randomizing MAC addresses to prevent tracking. However, Wi-Fi infrastructure, and in particular public hotspots, make use of MAC addresses for various functionality including authentication, accounting, customer support and analytics. Wi-Fi network operators generally assume a Wi-Fi client uses the same MAC address every time it connects to the network. Therefore, the changing of MAC addresses could lead to inaccurate or inflated billing, or the inability to login to a network on which the device was previously authorized.

BRIEF DESCRIPTION OF THE DRAWINGS

The present disclosure will be better understood with reference to the drawings, in which.

DETAILED DESCRIPTION

Figure 1:
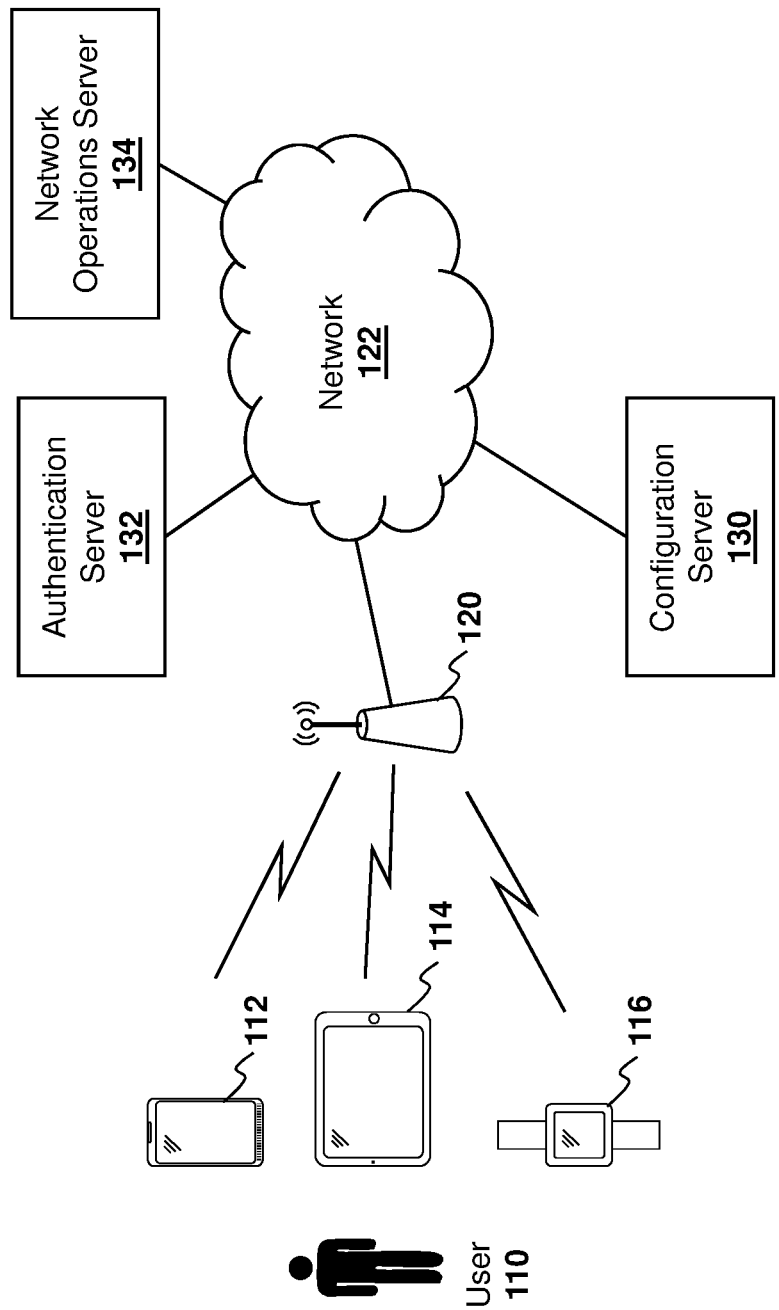
FIG. 1 is a block diagram showing an example system in which a plurality of Wi-Fi clients is connecting through an access point to infrastructure elements.

The present disclosure provides a method at an electronic device, the method comprising: initiating authentication with a network through a network element; providing a configuration request, the configuration request including an attribute set for the electronic device; and receiving a configuration response, the configuration response including a certificate or credential for future authentication with the network.

The present disclosure further provides an electronic device comprising: a processor; and a communications subsystem, wherein the electronic device is configured to: initiate authentication with a network through a network element; provide a configuration request, the configuration request including an attribute set for the electronic device; and receive a configuration response, the configuration response including a certificate or credential for future authentication with the network.

The present disclosure further provides a computer readable medium for storing instruction code, which, when executed by a processor of an electronic device cause the electronic device to: initiate authentication with a network through a network element; provide a configuration request, the configuration request including an attribute set for the electronic device; and receive a configuration response, the configuration response including a certificate or credential for future authentication with the network.

A Wi-Fi network operator can use the Wi-Fi client MAC address to collect diagnostics on connectivity issues; to track how long a Wi-Fi client is connected to a network over a period of time, for example to address time-based billing; to track how much data is transmitted between the Wi-Fi infrastructure and the Wi-Fi client over a period of time to address data limits; and to collect information on how many Wi-Fi clients a user may use in connecting to a network.

If a Wi-Fi client device chooses a random MAC address, or changes its MAC address based on a non-random scheme, such as a MAC address change protocol, that MAC address may change each time the device connects to a network. If the network operator uses the Wi-Fi client MAC address to monitor, limit or bill time-based or traffic-based network access, the network operator cannot track the activity or billing on a device across the different connections.

Further, a user may have multiple devices, and the network operator may have a business need to track which of the user's devices are operating on its network. This involves a network operator maintaining a device to user account mapping, and user accounts having the ability to have more than one device, possibly with limits. The assumption is such account mapping being that each unique device has a unique MAC address.

As indicated above, network operators typically assume that a Wi-Fi client uses the same MAC address every time it connects or reconnects to a network. When MAC address randomization or MAC address change protocols are used, then a Wi-Fi client changes its MAC address and network information about that Wi-Fi client's connectivity is terminated for the old MAC address and started afresh for the new MAC address. Such information may include, for example data activity or billing.

Apart from creating potential message overload in the network operator's recording network for Wi-Fi client activity or billing records, this new behavior of MAC address changes could cause short-term issues for the Wi-Fi client such as the production of many short duration billing records. This could potentially result in a very high total cost as opposed to a single, long-duration, bill that would have occurred when using a single MAC address.

Therefore, in accordance with the embodiments provided herein, information on the Wi-Fi client credentials can be exchanged with the network to uniquely identify the Wi-Fi client when it connects to the network. Such credentials can be derived from an attribute set initially shared with the network, which could include one or any combination of the following:

a. a global MAC address (or a hash of the global MAC address);

b. a unique identifier;

c. manufacturing (or owner) information; for example, this information could include details on network operators, Wi-Fi operators, carrier operators, network equipment manufacturers, equipment vendors, among other such information;

d. a Wi-Fi client class; and/or e. a device class.

In the above, in some cases the unique identifier may only be unique to a particular class of device. Further, the manufacturing or owner information may be tied to a particular kind of device such as a serial number tied to a particular piece of hardware. The Wi-Fi class may, for example, indicate that the type of device is a laptop, cell phone, or wearable, among other information. The device class may, for example, indicate that the type of device is a vehicle, bicycle, aircraft, road side unit, or an Internet of Things (IoT) device, among other information.

The attribute set is negotiated between the network provider and the user's electronic device when the Wi-Fi client is provisioned for network access. The attribute set, or a portion thereof, is then transmitted as part of the credential when the Wi-Fi client associates to the network.

In some embodiments, it is possible that a device may comprise multiple attribute sets. For example, this may occur when a device supports multiple Wi-Fi clients. When a user has multiple devices, it is also possible that the network operator establishes a binding, using the attribute set, so that as each device changes its MAC address, the plurality of devices can be tracked to the same user.

Reference is now made to FIG. 1, which shows the components used in the embodiments of the present disclosure. In particular, a user 110 may have one or more of devices associated with the user. For example, in FIG. 1, a user 110 has a mobile device 112, a tablet device 114, and a smart watch device 116. However, the embodiment of FIG. 1 is not limiting, and in some cases user 110 could have a different device or a subset of devices. For example, user 110 may be associated with an electronic device such as a laptop computer, desktop computer, Internet appliance, among other such devices. In other cases, the embodiments of the present disclosure may be used without a user 110. For example, a device may be an IoT device that is not associated with any particular user. As used herein, any device associated with a user or operating autonomously from a user may be referred to as an electronic device. Further, an electronic device is generally referred to herein as a Wi-Fi client.

The Wi-Fi client will typically communicate with an access point 120. The access point 120 provides network connectivity to a network 122. The network 122 may, in some cases, be the Internet. However, in other cases, the network 122 may be any local or wide area network.

The network has a set of logical services to facilitate network connectivity and perform network management. The logical services include configuration, authentication and network operations, which could in some cases all be performed by the same server, or in other cases be performed by separate servers. For example, in the embodiment of FIG. 1, a configuration server 130 provides a means to provision an electronic device with a credential.

An authentication server 132 authenticates devices when they connect to the network based on credentials provided by the configuration server 130.

A network operations server 134 provides billing, accounting, network monitoring, and policy enforcement for an electronic device once it establishes network access.

In accordance with the embodiments provided herein, an un-provisioned device communicates with the configuration server 130 either directly or through a provisioning network. The un-provisioned device provides credential attributes to the configuration server 130. The configuration server 130 includes some or all of the attributes as part of a credential and passes that information back to the electronic device to complete the configuration.

Figure 2:
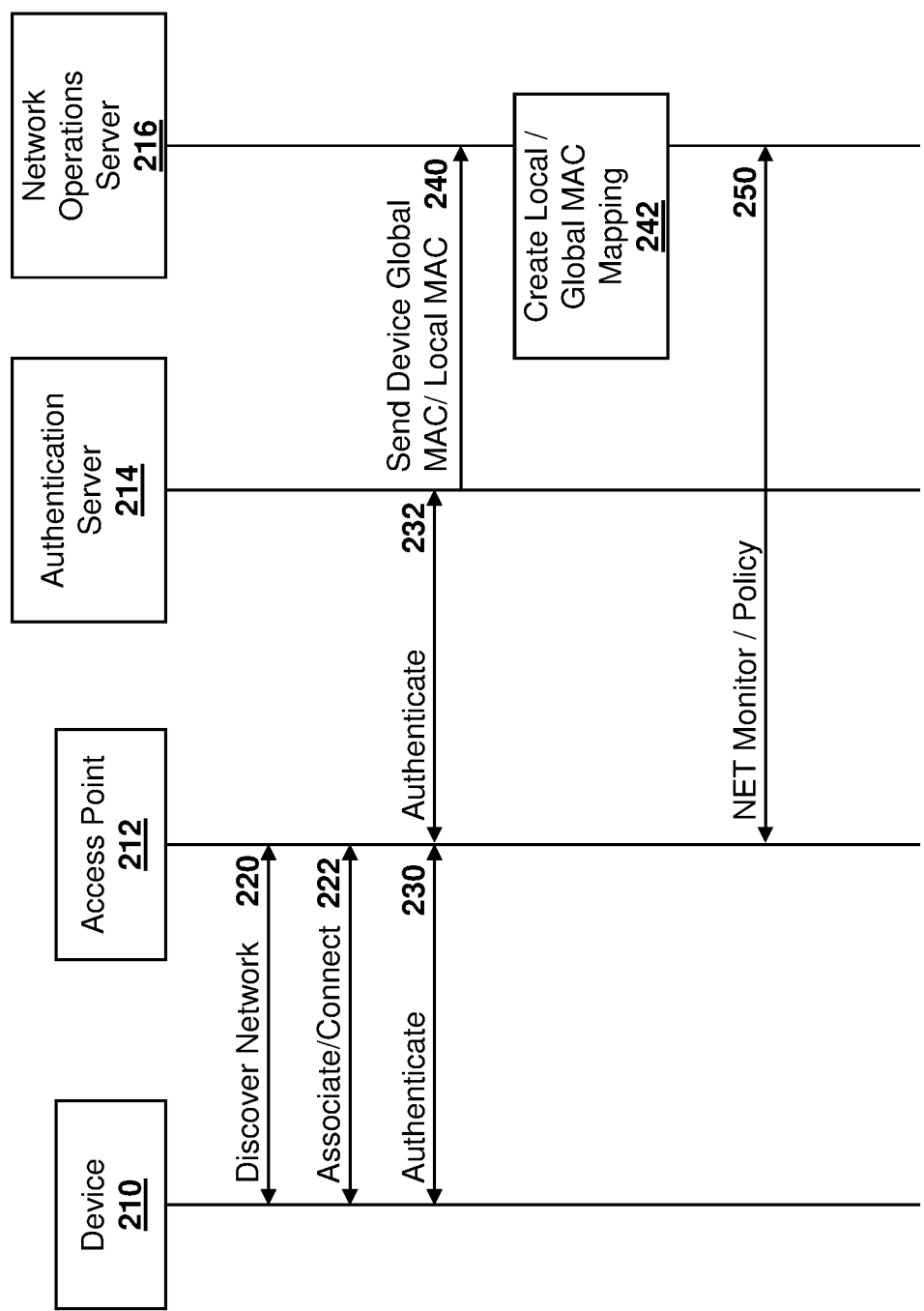
FIG. 2 is a dataflow diagram showing mapping between local MAC addresses and a unique identifier.

Reference is now made to FIG. 2. In the embodiment of FIG. 2, an electronic device at 210 communicates with an access point 212. Further, an authentication server 214 and a network operations server 216 operate as described below.

During connection, the electronic device 210 discovers and connects to the access point 212, as shown with arrows 220 and 222.

An authentication process is then started, as shown with arrows 230 and 232. During the authentication process, the electronic device 210 passes its credential attributes to the authentication server 214 through the access point 212.

During or after the authentication process, the authentication server 214 passes the credential attributes to the network operations server 216, as shown by arrow 240. The credential attributes may, for example, include a unique identifier, such as a global MAC address for the device, or may include any of the other attributes described above.

The network operations server 216 creates a mapping of the credential attributes to the identifier of electronic device that was used for the connection and association, as shown by block 242.

For the duration of the connection, the network operations server 216 uses the MAC address/credential mappings for billing, and monitoring, and network policy enforcement. Messages to enable these features are shown by arrow 250.

Modified DPP Operation

In accordance with one embodiment of the present disclosure, a Device Provisioning Protocol (DPP) may be used for credential provisioning and network access. In this case, the electronic device may be referred to as the "enrollee" and the configuration server may be referred to as the "configurator". In some cases, the access point may become the authentication server, as well as the network operations server.

During the configuration sequence, the enrollee includes the attribute set of the Wi-Fi client as an attribute within the configuration request. Specifically, reference is now made to FIG. 3.

Figure 3:
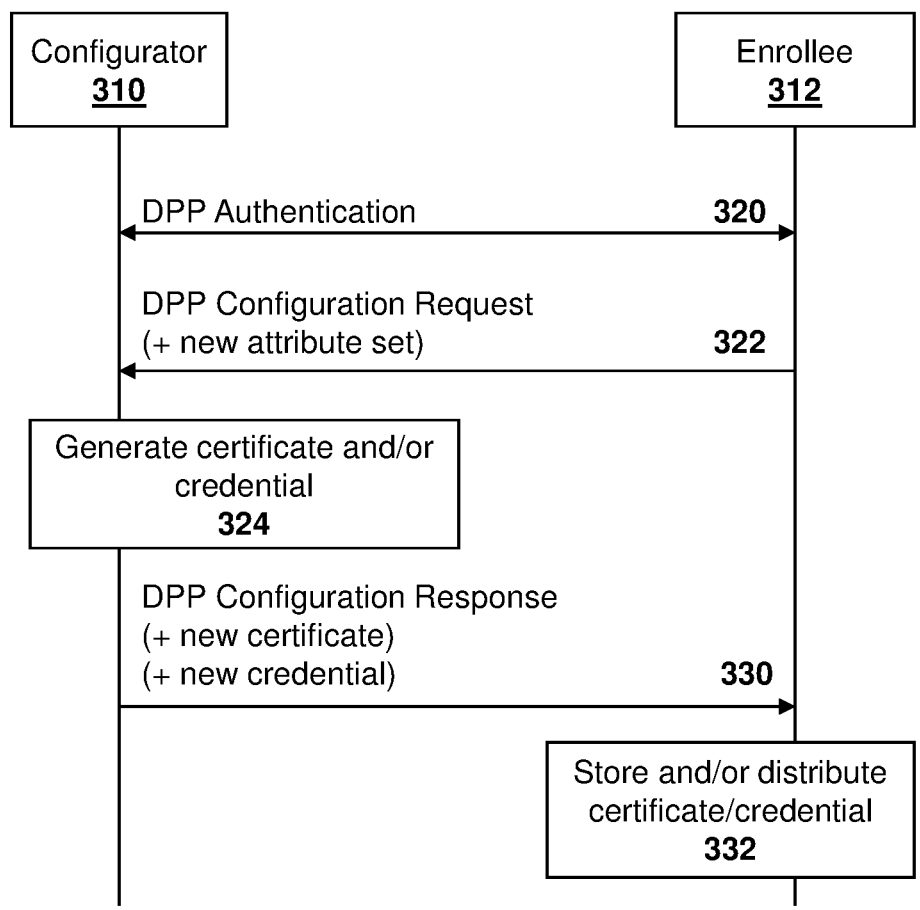
FIG. 3 is a dataflow diagram showing device provisioning protocol messaging between a configurator and an enrollee which includes an attribute set.

In accordance with the embodiment of FIG. 3, a mechanism is provided to assign the attribute set as part of the DPP provisioning sequence. The MAC address would be assigned as part of the configuration object. In some cases, the entire MAC address or a subset of the MAC address such as the upper bytes could be assigned. The assigned MAC address is stored and used for all connections in the future for that network.

Therefore, a configurator 310 communicates with enrollee 312. The DPP authentication mechanism is shown with arrow 320. This DPP authentication mechanism is similar to the DPP authentication mechanism performed currently between the enrollee and a configurator.

The enrollee 312 may then generate a new DPP configuration request 322. In the embodiment of FIG. 3, the DPP configuration request 322 includes a new attribute set for the enrollee 312. The new attribute set may include the attributes described above with regard to the electronic device. Specifically, the attribute set may contain one or more of: a Global MAC address or portion thereof; a unique identifier; manufacturing or owner information; and/or a Wi-Fi class; among other information.

The DPP configuration request with the new attribute set is received at the configurator 310. The configurator may then form a unique certificate for that Wi-Fi client, as shown at block 324. For example, the unique certificate could be formed utilizing a hash of the identifier (or portion of the identifier) utilizing a SHA-256 into a root certificate in one embodiment. However, other methodology for creating a unique certificate given the received attributes would be apparent to those skilled in the art.

In other cases, the configurator 310 may generate a credential rather than, or in addition to, a certificate at block 324. For example, the credential may be a public key/private key pair that is provided to the enrollee.

On generation of the certificate and/or credential, the configurator 310 returns a DPP configuration response 330. The DPP configuration response 330 includes the new certificate and/or the new credential.

The certificate and/or credential received in the DPP configuration response may be stored by the enrollee 312 and used for future connections to the network. Further, if a user has a plurality of devices, in some cases the certificate and/or credential can be distributed to those other devices. The storing and/or distribution are shown with block 332 in FIG. 3.

Thereafter, when a Wi-Fi client returns to a Wi-Fi infrastructure with which a certificate relationship or credential relationship has already been established, the Wi-Fi infrastructure can quickly recognize the Wi-Fi client when the device authenticates using the certificate and/or credential.

Further, when generating the certificate and/or credential at block 324, policies could be implemented for the enrollee 312. The policies could be based on the attribute information received in message 322.

Such policies could then be enforced within the network based on the use of the certificate and/or credential in future connections.

Therefore, by having an enrollee pass an attribute set during the DPP configuration request, where the attribute set uniquely identifies the enrollee, either per device or per user, this allows for the MAC address to be changed for each electronic device and still allows a network operator to connect the usage of a particular user or device within the Wi-Fi network.

More generally, the embodiments above the provide information in the device credentials that can be exchanged with the network to uniquely identify the device when it contacts the network. The credential contains a set of attributes which could include a global MAC address or a hash of such global MAC address, a unique identifier for the device, manufacturing information for the device, among other information. These attributes may be negotiated between the network provider and the user or electronic device when the electronic device is provisioned for network access. The attributes, or a subset thereof, are transmitted as part of the credential when the device associates to the network.

The servers and electronic devices performing the methods described above may be any electronic device or network node. Such electronic device or network node may include any type of computing device, including but not limited to, mobile devices such as smartphones or cellular telephones. Examples can further include fixed or mobile user equipments, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, among others. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), pedestrians and bicycles and other types of vehicles including any combinations of any of the foregoing, whether currently existing or after arising.

Figure 4:
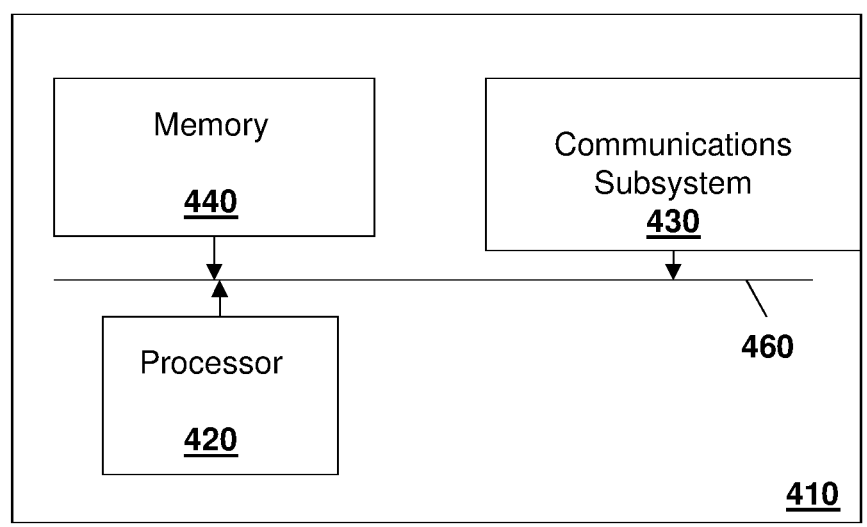
FIG. 4 is a block diagram of a simplified electronic device capable of being used with the methods and systems herein according to one embodiment.

One simplified diagram of a server or an electronic device is shown with regard to FIG. 4.

In FIG. 4, device 410 includes a processor 420 and a communications subsystem 430, where the processor 420 and communications subsystem 430 cooperate to perform the methods of the embodiments described above. Communications subsystem 420 may, in some embodiments, comprise multiple subsystems, for example for different radio technologies.

Processor 420 is configured to execute programmable logic, which may be stored, along with data, on device 410, and shown in the example of FIG. 4 as memory 440. Memory 440 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 440, device 410 may access data or programmable logic from an external storage medium, for example through communications subsystem 430.

Communications subsystem 430 allows device 410 to communicate with other devices or network elements and may vary based on the type of communication being performed. Further, communications subsystem 430 may comprise a plurality of communications technologies, including any wired or wireless communications technology.

Communications between the various elements of device 410 may be through an internal bus 460 in one embodiment. However, other forms of communication are possible.

Further, if the electronic device has user equipment capabilities, one example electronic device is described below with regard to FIG. 5.

Electronic device 500, in accordance with the present disclosure, includes a communication subsystem 540. Communication subsystem 540 includes Wi-Fi communications capabilities, typically by including a Wi-Fi chipset, and may further include other communications systems including WiMAX or near field communications, among others.

Further, electronic device 500 may comprise a two-way wireless communication device having voice or data communication capabilities or both. Electronic device 500 may have the capability to communicate with other computer systems. Depending on the exact functionality provided, the electronic device may also be referred to as a data messaging device, a two-way pager, a wireless e-mail device, a smartphone, a cellular telephone with data messaging capabilities, a wireless Internet appliance, a wireless device, a mobile device, an embedded cellular modem or a data communication device, as examples.

Where electronic device 500 is also enabled for two-way communication through cellular, it may incorporate a communication subsystem 511, including a receiver 512 and a transmitter 514, as well as associated components such as one or more antenna elements 516 and 518, local oscillators (LOs) 513, and a processing module such as a digital signal processor (DSP) 520. As will be apparent to those skilled in the field of communications, the particular design of the communication subsystem 511 will be dependent upon the communication network in which the electronic device is intended to operate.

Network access requirements will also vary depending upon the type of network 519. In some networks, network access is associated with a subscriber or user of the electronic device 500. An electronic device may require an embedded or a removable user identity module (RUIM) or a subscriber identity module (SIM) card or a UMTS SIM (USIM) in order to operate on a network. The USIM/SIM/RUIM interface 544 is normally similar to a card-slot into which a USIM/SIM/RUIM card can be inserted and ejected. The USIM/SIM/RUIM card can have memory and hold many key configurations 551, and other information 553 such as identification, and subscriber related information.

When required network registration or activation procedures have been completed, electronic device 500 may send and receive communication signals over the network 519. As illustrated in FIG. 5, network 519 can include multiple base stations communicating with the mobile device.

Signals received by antenna 516 through communication network 519 are input to receiver 512, which may perform such common receiver functions as signal amplification, frequency down conversion, filtering, channel selection and the like. Analog to digital (A/D) conversion of a received signal allows more complex communication functions such as demodulation and decoding to be performed in the DSP 520. In a similar manner, signals to be transmitted are processed, including modulation and encoding for example, by DSP 520 and input to transmitter 514 for digital to analog (D/A) conversion, frequency up conversion, filtering, amplification and transmission over the communication network 519 via antenna 518. DSP 520 not only processes communication signals, but also provides for receiver and transmitter control. For example, the gains applied to communication signals in receiver 512 and transmitter 514 may be adaptively controlled through automatic gain control algorithms implemented in DSP 520.

Electronic device 500 generally includes a processor 538 which controls the overall operation of the device. Communication functions, including data and voice communications, are performed through communication subsystem 511. Processor 538 also interacts with further device subsystems such as the display 522, flash memory 524, random access memory (RAM) 526, auxiliary input/output (I/O) subsystems 528, serial port 530, one or more keyboards or keypads 532, speaker 534, microphone 536, other communication subsystem 540 such as a short-range communications subsystem or DSRC subsystem, and any other device subsystems generally designated as 542. Serial port 530 could include a USB port, On-Board Diagnostics (OBD) port or other port known to those in the art.

Figure 5:
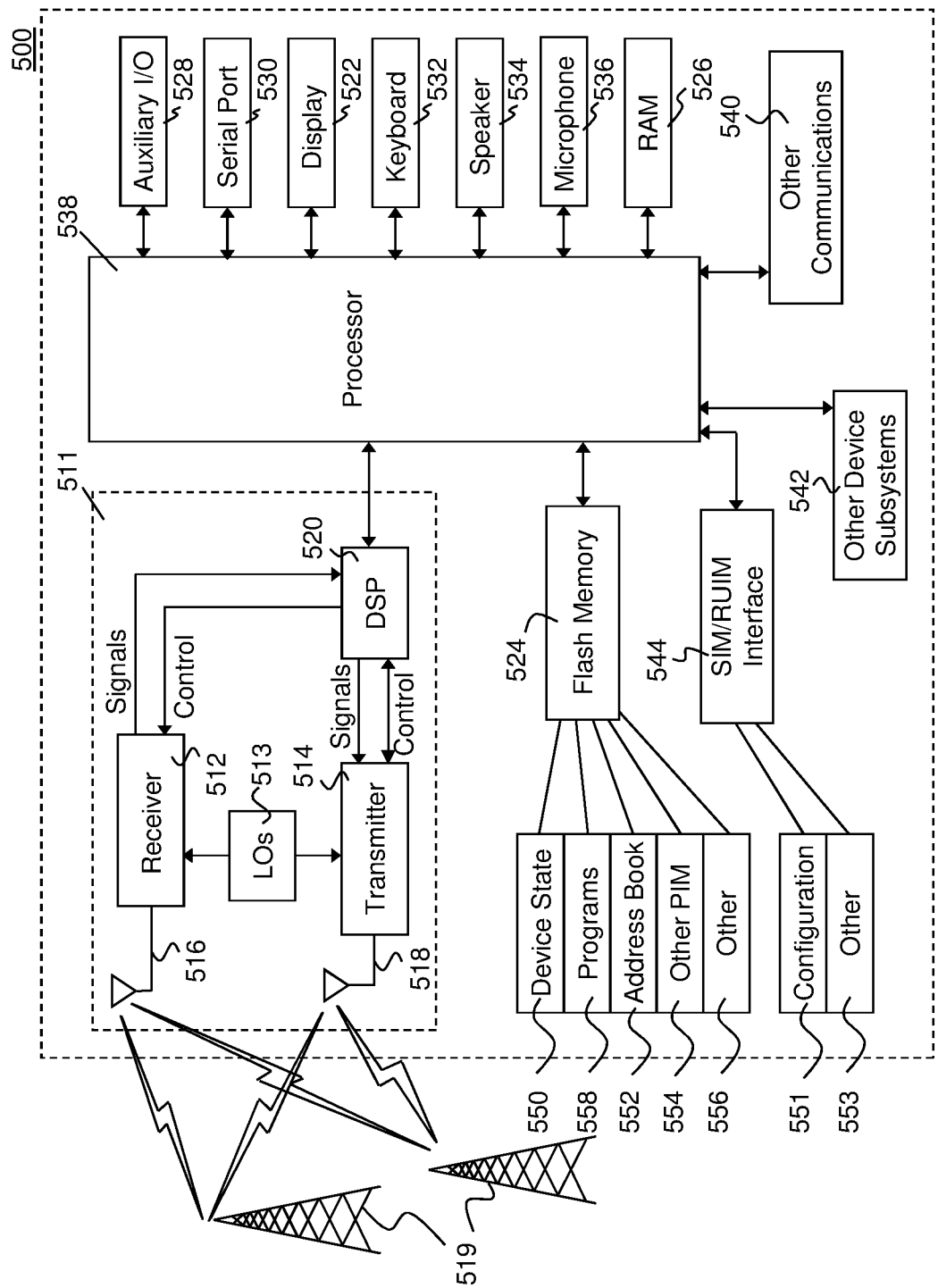
FIG. 5 is a block diagram of a mobile device according to one embodiment.

Some of the subsystems shown in FIG. 5 perform communication-related functions, whereas other subsystems may provide "resident" or on-device functions. Notably, some subsystems, such as keyboard 532 and display 522, for example, may be used for both communication-related functions, such as entering a text message for transmission over a communication network, and device-resident functions such as a calculator or task list.

Operating system software used by the processor 538 may be stored in a persistent store such as flash memory 524, which may instead be a read-only memory (ROM) or similar storage element (not shown). Those skilled in the art will appreciate that the operating system, specific device applications, or parts thereof, may be temporarily loaded into a volatile memory such as RAM 526. Received communication signals may also be stored in RAM 526.

As shown, flash memory 524 can be segregated into different areas for both computer programs 558 and program data storage 550, 552, 554 and 556. These different storage types indicate that each program can allocate a portion of flash memory 524 for their own data storage requirements. Processor 538, in addition to its operating system functions, may enable execution of software applications on the electronic device. A predetermined set of applications that control basic operations, including potentially data and voice communication applications for example, will normally be installed on electronic device 500 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the electronic device such as, but not limited to, e-mail, messages, calendar events, voice mails, appointments, and task items. Further applications, including productivity applications, messaging applications, social media applications, games, among others, may also be loaded onto the electronic device 500 through the network 519, an auxiliary I/O subsystem 528, serial port 530, short-range communications subsystem 540 or any other suitable subsystem 542, and installed by a user in the RAM 526 or a non-volatile store (not shown) for execution by the processor 538. Such flexibility in application installation increases the functionality of the device and may provide enhanced on-device functions, communication-related functions, or both.

In a data communication mode, a received signal such as a text message or web page download will be processed by the communication subsystem 511 and input to the processor 538, which may further process the received signal for output to the display 522, or alternatively to an auxiliary I/O device 528.

A user of electronic device 500 may also compose data items such as messages for example, using the keyboard 532, which may be a complete alphanumeric keyboard or telephone-type keypad, either physical or virtual, among others, in conjunction with the display 522 and possibly an auxiliary I/O device 528. Such composed items may then be transmitted over a communication network through the communication subsystem 511.

Where voice communications are provided, overall operation of electronic device 500 is similar, except that received signals may typically be output to a speaker 534 and signals for transmission may be generated by a microphone 536. Alternative voice or audio I/O subsystems, such as a voice message recording subsystem, may also be implemented on electronic device 500. Although voice or audio signal output is preferably accomplished primarily through the speaker 534, display 522 may also be used to provide an indication of the identity of a calling party, the duration of a voice call, or other voice call related information for example.

Serial port 530 in FIG. 5 may be implemented in an electronic device for which synchronization with a user's desktop computer (not shown) may be desirable, but is an optional device component. Such a port 530 may enable a user to set preferences through an external device or software application and may extend the capabilities of electronic device 500 by providing for information or software downloads to electronic device 500 other than through a wireless communication network. As will be appreciated by those skilled in the art, serial port 530 can further be used to connect the electronic device to a computer to act as a modem or for charging a battery on the electronic device.

In addition to Wi-Fi capabilities, other communications subsystems 540 may further provide for communication between electronic device 500 and different systems or devices, which need not necessarily be similar devices. For example, the subsystem 540 may include an infrared device and associated circuits and components or a Bluetooth™ or Bluetooth™ Low Energy communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at an electronic device, the method comprising:
   initiating authentication with a network through a network element;
   providing a Device Provisioning Protocol (DPP) request to a server of the network, the DPP request including an attribute set for the electronic device, wherein the attribute set contains a global Media Access Control (MAC) address of the electronic device or a hash of the global MAC address of the electronic device;
   receiving a DPP response from the server of the network, the DPP response including a certificate or credential for future authentication with the network, wherein the certificate or credential includes a hash of at least a portion of the attribute set;
   obtaining a new MAC address, wherein the obtaining comprises choosing a random MAC address;
   sending a request to find a connection point, the request comprising the new MAC address;
   receiving a response to the request; and
   providing the certificate or credential to the network for authentication;
   wherein the certificate or credential is used to map the new MAC address to the electronic device.

2. The method of claim 1, wherein the attribute set contains a unique identifier for the electronic device.

3. The method of claim 2, wherein the identifier is unique for one or more of a type of the electronic device; for the network operator; for a Wi-Fi operator; for a Carrier operator; for a network equipment manufacturer; or for an equipment vendor.

4. The method of claim 1, wherein the attribute set includes a Wi-Fi client class for the electronic device.

5. The method of claim 1, wherein the network is a Wi-Fi network.

6. The method of claim 1, further comprising providing the certificate or credential to a second electronic device associated with the electronic device for use by the second electronic device when authenticating to the network.

7. An electronic device comprising:
   a processor; and
   a communications subsystem,
   wherein the electronic device is configured to:
   initiate authentication with a network through a network element;
   provide a Device Provisioning Protocol (DPP) request to a server of the network, the DPP request including an attribute set for the electronic device, wherein the attribute set contains a global Media Access Control (MAC) address of the electronic device or a hash of the global MAC address of the electronic device;
   receive a DPP response from the server of the network, the DPP response including a certificate or credential for future authentication with the network, wherein the certificate or credential includes a hash of at least a portion of the attribute set;
   obtain a new MAC address, wherein the obtaining comprises choosing a random MAC address;
   send a request to find a connection point, the request comprising the new MAC address;
   receive a response to the request from the network; and
   provide the certificate or credential to the network for authentication;
   wherein the certificate or credential is used to map the new MAC address to the electronic device.

8. The electronic device of claim 7, wherein the attribute set contains a unique identifier for the electronic device.

9. The electronic device of claim 8, wherein the identifier is unique for one or more of a type of the electronic device; for the network operator; for a Wi-Fi operator; for a Carrier operator; for a network equipment manufacturer; or for an equipment vendor.

10. The electronic device of claim 7, wherein the attribute set includes a Wi-Fi client class for the electronic device.

11. The electronic device of claim 7, wherein the network is a Wi-Fi network.

12. The electronic device of claim 7, wherein the electronic device is further configured to provide the certificate or credential to a second electronic device associated with the electronic device for use by the second electronic device when authenticating to the network.

13. A non-transitory computer readable medium for storing instruction code, which, when executed by a processor of an electronic device cause the electronic device to:
   initiate authentication with a network through a network element;
   provide a Device Provisioning Protocol (DPP) request to a server of the network, the DPP request including an attribute set for the electronic device, wherein the attribute set contains a global Media Access Control (MAC) address of the electronic device or a hash of the global MAC address of the electronic device;
   receive a DPP response from the server of the network, the DPP response including a certificate or credential for future authentication with the network, wherein the certificate or credential includes a hash of at least a portion of the attribute set;
   obtain a new MAC address, wherein the obtaining comprises choosing a random MAC address;
   send a request to find a connection point, the request comprising the new MAC address;
   receive a response to the request from the network; and
   provide the certificate or credential to the network for authentication;
   wherein the certificate or credential is used to map the new MAC address to the electronic device.

* * * * *